United States Patent
Page et al.

(10) Patent No.: US 6,795,872 B2
(45) Date of Patent: Sep. 21, 2004

(54) MAINTAINING AT LEAST PARTIAL FUNCTIONALITY OF A DEVICE AS DEFINED BY A HARDWARE CONFIGURATION AT A USB BUS ENUMERATION WHILE THE DEVICE MEMORY IS PROGRAMMED

(75) Inventors: James W. Page, Durham, NC (US); Christopher B. Brandt, Raleigh, NC (US)

(73) Assignee: Renesas Technology America, Inc., San Jose, CA (US)

( * ) Notice: Subject to any disclaimer, the term of this patent is extended or adjusted under 35 U.S.C. 154(b) by 241 days.

(21) Appl. No.: 10/142,318

(22) Filed: May 9, 2002

(65) Prior Publication Data

US 2003/0217254 A1 Nov. 20, 2003

(51) Int. Cl.[7] ............................................... G06F 13/10
(52) U.S. Cl. ............................... 710/8; 710/104; 713/1; 713/100; 711/103
(58) Field of Search ............................ 710/8, 10, 104, 710/105; 713/1, 100; 711/103, 170, 173

(56) References Cited

U.S. PATENT DOCUMENTS

| | | | |
|---|---|---|---|
| 6,134,628 A | | 10/2000 | Hamadani |
| 6,148,354 A | * | 11/2000 | Ban et al. .................. 710/301 |
| 6,154,837 A | | 11/2000 | Fudeyasu et al. |
| 6,188,602 B1 | * | 2/2001 | Alexander et al. ...... 365/185.04 |
| 6,237,091 B1 | * | 5/2001 | Firooz et al. .................. 713/1 |
| 6,357,021 B1 | * | 3/2002 | Kitagawa et al. ............. 714/41 |
| 6,609,127 B1 | * | 8/2003 | Lee et al. ..................... 707/10 |

OTHER PUBLICATIONS

U.S. patent application Ser. No. 09/896,780, Cocca filed Jun. 26, 2001.
Universal Serial Bus Device Class Specification for Device Firmware Upgrade, Version 1.0, May 13, 1999, p. 1–44.

* cited by examiner

Primary Examiner—Ilwoo Park
(74) Attorney, Agent, or Firm—Burns, Doane, Swecker, and Mathis, L.L.P.

(57) ABSTRACT

Method and apparatus for programming non-volatile, programmable, electrically-erasable memory using a USB interface are presented. According to one aspect, a method for in-system programming of non-volatile, programmable, electrically erasable device memory using a USB interface includes the steps of: enumerating at least one device onto a USB bus with a first hardware configuration; encapsulating programming commands and program data into USB packets according to a custom protocol; sending the USB packets including the encapsulated programming commands and program data to the at least one device over the USB bus; and programming at least a portion of the device memory in response to receiving the programming commands and program data at the at least one device. At least partial functionality of the at least one device as defined by the first hardware configuration is maintained while the device memory is programmed.

33 Claims, 9 Drawing Sheets

| BmRequestType | BRequest | WValue | Windex | Wlength | Data |
|---|---|---|---|---|---|
| 0x00 | Set_Configuration | Config Value | 0x00 | 0x00 | None |

FIG. 3

MAINTAINING AT LEAST PARTIAL FUNCTIONALITY OF A DEVICE AS DEFINED BY A HARDWARE CONFIGURATION AT A USB BUS ENUMERATION WHILE THE DEVICE MEMORY IS PROGRAMMED

BACKGROUND

The present invention is related to programming non-volatile memory, and more particularly to methods and apparatus for programming electrically erasable non-volatile memory using a Universal Serial Bus (USB) interface.

USB is fast becoming the defacto bus interface standard for low to medium speed personal computer (PC) to peripheral device interconnections. The USB interface achieves transport speeds that are fast enough for supporting high-speed printers, CD-quality audio playback, and high-resolution scanners. USB expansion hubs make the bus available for supporting dozens of USB capable devices simultaneously. Detailed information regarding USB functionality and capabilities may found in the Universal Serial Bus Specification, Revision 2.0 (Apr. 27, 2000).

USB has gained popularity for several reasons. First, a USB device can be plugged into the bus at anytime, even when the PC is turned on; a feature commonly referred to in industry as "plug-n-play". When the PC detects that a USB device has been plugged in, the PC automatically interrogates the device to learn its capabilities and requirements. Using this information, the PC then automatically loads the device's driver into the operating system. Later, when the device is unplugged from the bus, the operating system automatically "logs off" the device from the bus, and unloads its driver from the system.

Another reason for the growing popularity of the USB interface is that the built-in plug-n-play capability eliminates the need to manually set DIP switches, insert jumpers, or load configuration programs, in order to properly configure devices attached to the bus. Also, USB connected devices do not result in the hardware conflicts (e.g., IRQ, DMA, MEMORY, or I/O conflicts) that commonly occur when connecting devices to today's conventional serial and parallel I/O buses.

USB devices are sold with internally stored software (or firmware) that controls the operation of the device. This firmware is typically stored in non-volatile, electrically erasable, programmable memory, such as the popular flash memory developed by Intel Corporation. Users that have purchased USB capable devices may occasionally require the ability to upgrade this firmware with improved versions, or with firmware patches, as such upgrades become available from the device manufacturers.

These firmware upgrades may be effected in several ways. For example, if the firmware is stored on a separate memory module in the device, the module may be removed from the device and replaced with a new memory module that includes the firmware updates. This manual upgrade method has the disadvantages of being both difficult and time consuming to perform, as well as typically requiring that the device be powered off to effect the upgrade. Also, this manual method requires the firmware to be stored on a dedicated memory module within the device, which may lead to inefficient use of memory in the device.

An easier and more efficient method of upgrading the firmware installed in a peripheral device has been to use an existing device I/O bus to upgrade the firmware code. With this method, either the entire firmware program may be first erased, and then overwritten with the new firmware code, or only a portion of the originally installed firmware may be overwritten with a corresponding firmware "patch".

Alternatively, the hardware may be so configured so as to allow firmware patches to be installed in specially reserved portions of the system memory, and then automatically executed under certain program conditions to effect a firmware upgrade. Such an arrangement is described in copending U.S. patent application Ser. No. 09/896,780, entitled "Method and Apparatus for Dynamically Modifying a Stored Program", assigned to the same assignee as this application.

To use an existing I/O bus to upgrade the firmware code stored in device, it is first necessary to develop a transfer protocol that controls and oversees the firmware upgrade process. Generally, a different transfer protocol must be developed for each corresponding I/O bus type used to upgrade the firmware.

In the case of USB, a transfer protocol for effecting firmware upgrades in USB capable devices has been proposed by the USB Implementors Forum (USB-IF). This group has published a document for its proposed transfer protocol entitled "Universal Serial Bus Device Class Specification for Device Firmware Upgrade", Version 1.0, May 13, 1999. This document describes proposed requirements and specifications for implementing USB devices that are capable of supporting the group's proposed Device Firmware Upgrade (DFU) function.

A drawback of the proposed DFU solution is that concurrent execution of both DFU operations and normal run-time activities is not possible within the USB device. The proposed specification requires that all normal run-time activities must cease for the duration of any DFU (upgrade) operations. This implementation thus requires that a device re-enumerate, or change its operating mode, to effect a firmware upgrade. For example, according to the proposed specification, a printer would not function as a printer while undergoing a firmware upgrade. Instead, the printer would be operating as a firmware programmer during DFU operations. This is due, at least in part, to the fact that under the DFU proposal, only a single endpoint (or channel) is active between the programming host and the USB device. Typically, re-enumeration requires that the device be physically disconnected from the USB bus. In contrast, the techniques described below employ several endpoints between the host and USB device to maintain normal device operations, even while the device firmware is being programmed or updated.

The type of memory programming described in the DFU proposal is referred to as "in-circuit" programming. While the memory need not be removed from its circuitry, the device nevertheless no longer operates in its normal mode during the programming phase. In-circuit programming is to be contrasted with in-system programming (a feature of the techniques described herein), in which a device continues to operate (at least partially) in its normal mode of operation during the programming process. Another important advantage to programming device firmware in-system is that host device drivers, used to communicate with the device during its operation, need not be uninstalled while the firmware is being programmed, and then reinstalled when the programming process has ended. Not having to uninstall then reinstall device drivers saves time and host system resources.

Others have approached the problem of effecting firmware upgrades in USB devices in an entirely different manner. For example, Cypress Semiconductor offers a solution called "EZ-USB", that includes an internal microprocessor and internal random access memory (RAM) for program and data storage in the USB device itself. The use of volatile RAM to store the device firmware, rather the non-volatile memory used in other USB devices, makes the EZ-USB product a so-called "soft solution" product. During normal operation, a USB host (e.g., the PC) may initiate a download of program instructions into the device internal microprocessor, and device "personality" firmware into the device internal RAM over the USB bus. After the download completes, the EZ-USB device is reconnected to the PC as a newly customized device defined by the downloaded personality firmware.

Although this solution does provide for the ability to download new firmware over a USB interface at any time during device operation, the solution nevertheless has some drawbacks. First, because the firmware is stored in RAM instead of some other form of non-volatile memory, the firmware will be lost should power to the device ever be inadvertently disconnected during operation. Firmware loss may also occur if the device is mistakenly disconnected from the USB interface in bus-powered devices. Second, whenever a firmware download is initiated by the PC host, the EZ-USB device must first be disconnected from the host when the download completes, and then be reconnected (or re-enumerated as it commonly referred to as) by the host before the upgraded device may be used in its new configuration. This limitation deprives the user of the ability to utilize the device during firmware upgrades.

SUMMARY

Accordingly, there is a need for a solution to both quickly and easily update the firmware stored in memory of a USB device.

To address those needs, Applicants have invented certain methods and apparatus for programming non-volatile, programmable, electrically-erasable memory using a USB interface. According to one aspect, a method for in-system programming of non-volatile, programmable, electrically erasable device memory using a USB interface is presented, the method including the steps of: enumerating at least one device onto a USB bus with a first hardware configuration; encapsulating programming commands and program data into USB packets according to a custom protocol; sending the USB packets including the encapsulated programming commands and program data to the at least one device over the USB bus; and programming at least a portion of the device memory in response to receiving the programming commands and program data at the at least one device. At least partial functionality of the at least one device as defined by the first hardware configuration is maintained while the device memory is programmed.

According to a related aspect, the method further includes the steps of: changing at least partially the first hardware configuration of the at least one device in response to receiving a first programming command at the at least one device; loading at least one of a plurality control functions of a code module stored in a portion of the device memory into RAM; executing the at least one control function from RAM using the programming commands and program data received at the at least one device to program the device memory; and restoring the hardware configuration of the device back to the first hardware configuration in response to receiving a second programming command at the at least one device after the device memory is programmed.

According to another related aspect, the code module includes at least: a main loop function for managing the processing of programming commands sent over the USB bus; a packet exchange function for transferring USB packets over the USB bus; a vendor request function for encapsulating/extracting programming commands and program data into/from the USB packets according to the custom protocol; an erase function for erasing information stored in the at least a portion of the device memory; a write function for writing program data extracted from the USB packets by the vendor request function to the at least a portion of the device memory; and a read function for reading program information stored in the at least a portion of the device memory.

According to yet another related aspect, the method further includes the steps of: disabling interrupts associated with the first hardware configuration in response to receiving the first programming command; copying an interrupt vector table for processing interrupts associated with the first hardware configuration to RAM; and enabling interrupts associated with the first hardware configuration to be processed from RAM.

According to yet another related aspect, the method further includes the step of: erasing information stored in the at least a portion of the device memory prior to the programming step in response to receiving a third programming command at the at least one device. The step of erasing information stored in the at least a portion of the device memory the steps of: determining the location and size of the at least a portion of the device memory to be erased from information included in the third programming command; loading an erase function stored in a portion of the device memory into RAM; executing the erase function from RAM to erase the information stored in the at least a portion of the device memory; and sending status information over the USB bus upon completion of the erasing of the information stored in the at least a portion of the device memory.

According to yet another related aspect, the method further includes the step of: reading information stored in the at least a portion of the device memory after the programming step in response to receiving a fourth programming command at the at least one device. The step of reading information stored in the at least a portion of the device memory includes the steps of: determining the location and size of the at least a portion of the device memory to be read from information included in the fourth programming command; loading a read function stored in a portion of the device memory into RAM; executing the read function from RAM to read the information stored in the at least a portion of the device memory and to send the read information over the USB bus; and sending status information over the USB bus upon completion of the reading and sending of the information stored in the at least a portion of the device memory.

According to yet another related aspect, the method further includes the steps of: verifying the information read from the at least a portion of the device memory to determine if the information is properly programmed into the device memory; and reprogramming information into the at least a portion of the device memory determined to be invalid in the verifying step. The step of programming the at least a portion of the device memory includes the steps of: determining the location and size of the at least a portion of the device memory to be programed from information included in the programming commands; receiving the program data sent over the USB bus into a RAM buffer until one of the RAM buffer is full and no more program data is received; loading a program data function stored in a portion of the device memory into RAM; executing the program data function from RAM to store the received program data into the at least a portion of the device memory; repeating the steps of receiving program data and executing the program data function when the RAM buffer is full and additional program data remains to be stored in the device memory; and sending status information over the USB bus upon completion of the storing of the program data into the at least a portion of the device memory.

According to yet another related aspect, the method further includes the steps of: enumerating multiple USB devices onto the USB bus, each with a respective first hardware configuration; and controlling the flow of programming commands and program data sent over the USB bus to each of the devices enumerated onto the USB bus to manage the simultaneous programming of at least a portion of the device memory included in each respective device.

According to yet another related aspect, a plurality of endpoints are used to exchange information encapsulated into USB packets according to the custom protocol over the USB bus, the endpoints including: a control endpoint for exchanging USB packets having encapsulated programming commands; a bulk endpoint having a bulk IN channel for sending USB packets having encapsulated program data to the at least one device and a bulk OUT channel for sending USB packets having encapsulated program data from the at least one device over the USB bus; and an interrupt IN endpoint for sending USB packets having encapsulated status information from the at least one device over the USB bus.

According to yet another related aspect, information encapsulated into USB packets according to the custom protocol and exchanged over the USB bus includes information stored in: a request type field; a request identifier field; a request value field; a data field; a data length fields; and an address index field.

According to yet another related aspect, the information stored in the request type field is one of a standard type request, a class type request, and a vendor type request. If the information stored in the request type field is a vendor type request, the information stored in the request identifier field includes one of at least an erase request, a device memory write request, a device memory read request, a check_id request, a get_device_info request, a RAM read request, a RAM write request, and a jump-to-function request.

It should be emphasized that the terms "comprises" and "comprising", when used in this specification as well as in the claims, are taken to specify the presence of stated features, steps or components; but the use of these terms does not preclude the presence or addition of one or more other features, steps, components or groups thereof.

BRIEF DESCRIPTION OF THE DRAWINGS

The above and other objects, features, and advantages of the present invention will become more apparent in light of the following detailed description in conjunction with the drawings, in which like reference numerals identify similar or identical elements, and in which:

FIG. 3 illustrates a standard request type definition for a change configuration command shown typical of all USB standard, class, or vendor type requests;

DETAILED DESCRIPTION

Preferred embodiments of the present invention are described below with reference to the accompanying drawings. In the following description, well-known functions and/or constructions are not described in detail to avoid obscuring the invention in unnecessary detail. Moreover, while the term "flash" memory may be used throughout the detailed description, it will be understood that the described techniques are equally suited for programming any type of non-volatile, programmable, electrically erasable memory over a USB interface.

Before describing the preferred embodiments in detail, it will be helpful to first define some basic concepts associated with the USB protocol. These concepts are:

Enumeration: Detection and initial communication performed when a device is first connected to a host PC. Conceptually, enumeration operates as a discovery phase between the USB device and host PC during which it is determined how best to communicate with each other;

Device Driver: Host software that allows PC applications to communicate with external devices (e.g., a USB device);

Configuration: The USB specification provides for devices to have multiple configurations, or "faces". These configurations are dynamic in nature and are selectable while device remains operational;

NAK/ACK: Flow control tokens that are used to determine packet transmission status or available bandwidth for new packets to be received over the USB interface;

DMA: Direct Memory Access Controller. This is typically a microcontroller block that allows for fast data transfer between different memory areas of the device;

Packets: Collections of data transmitted between the PC and a target device over the USB interface;

Relative Addressing: Contrasted with absolute addressing, relative addressing uses indexing performed using a variable pointer, typically of the form ((location),offset);

Structured Assembler: Macro language that allows programmers to use "C" language type constructs in writing assembly code; and Vendor Requests: A version of USB standard requests that allow a user to pass control data to the device via endpoint zero (EP0). Much of the communication between the host PC and device during re-flash operations occurs using these requests. Other types of USB requests include both Standard Requests and Class Requests. The reader is referred to the USB specification for a more detailed description of these various types of requests.

Figure 1:
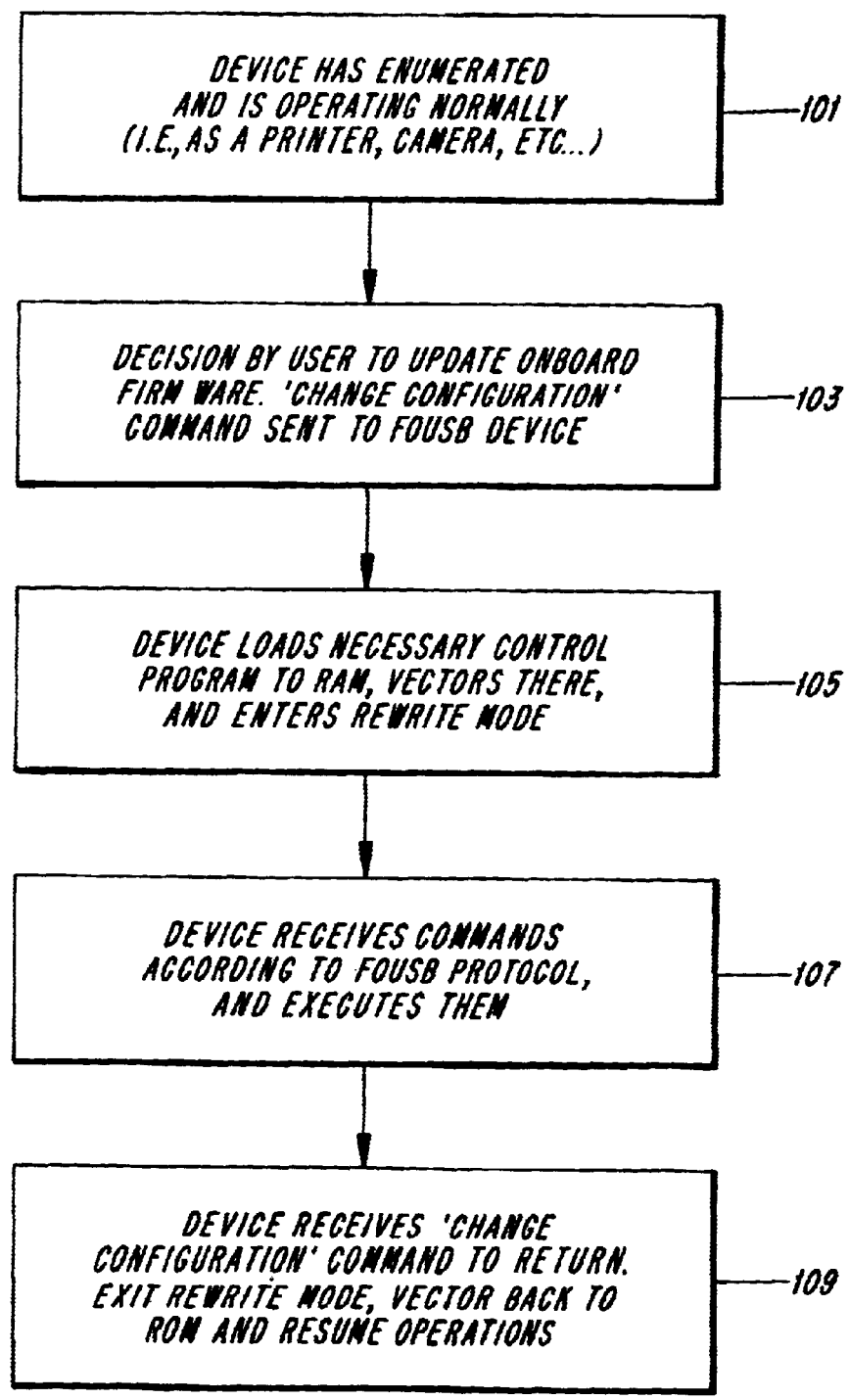
FIG. 1 is a flowchart depicting a high-level overview of a technique for programming the firmware of a USB compatible device using a USB interface.

FIG. 1 is a flowchart depicting a high-level overview of a preferred technique for programming the firmware of a USB compatible device using a USB interface. The technique begins at step 101 where the device is shown to already be enumerated and performing its normal operations (e.g., the device is operating as printer, camera, microcontroller, etc.). A configuration change occurs at step 103 causing the device to enter a firmware "rewrite" mode. The configuration change may occur as the result of intervention by a user, device driver, or other method. Once the configuration occurs, the device can be written to and read from using a USB-based protocol (referred to as a flash over USB, or "FOUSB" protocol) that properly frames the data and requests transferred between the device and host PC.

To manage this flow of information, the device loads an appropriate control program in RAM at step 105. Program execution in the device is then "vectored" to the location of the control program in RAM, and the control is executed. Next at step 107, the device executes commands received from the host PC according to the FOUSB protocol. Then, after all commands from the host PC have been executed to perform the desired task, the device again receives a change configuration command at step 109. This second change configuration command is used to instruct the device to cease execution of the control program, and to vector program execution back to ROM to resume normal device operations.

Importantly, the device remains enumerated, e.g., as a printer, camera, microcontroller, etc., during execution of the control program. While not all device functions may be available during execution of the control program, at least a basic set of device functions can be made to remain operational. Moreover, intervention during execution of the control program by a user, device driver, or other method, may be detected by the host PC, and execution of the control program halted, if necessary, to perform the desired task.

According to a preferred embodiment, the following list of functions are at least implemented to effect the programming and reprogramming of the device firmware:

Erasing specific blocks (typically defined within the device specification) or the entire memory block;

Programming the entire memory, preferably in units as small as one byte;

Reading the contents of the memory and returning that data to the host PC for verification;

Software security functions (again, typically defined within the device specification) to, among other things, deter unwanted access to the firmware; and Support functions for reading and writing RAM areas for quick analysis or debug capabilities.

Other functions to address specific user requirements may be added if necessary. These functions may be added by placing the execution code for the appropriate functions in memory and using the DMA to transfer these to RAM for execution.

Figure 2:
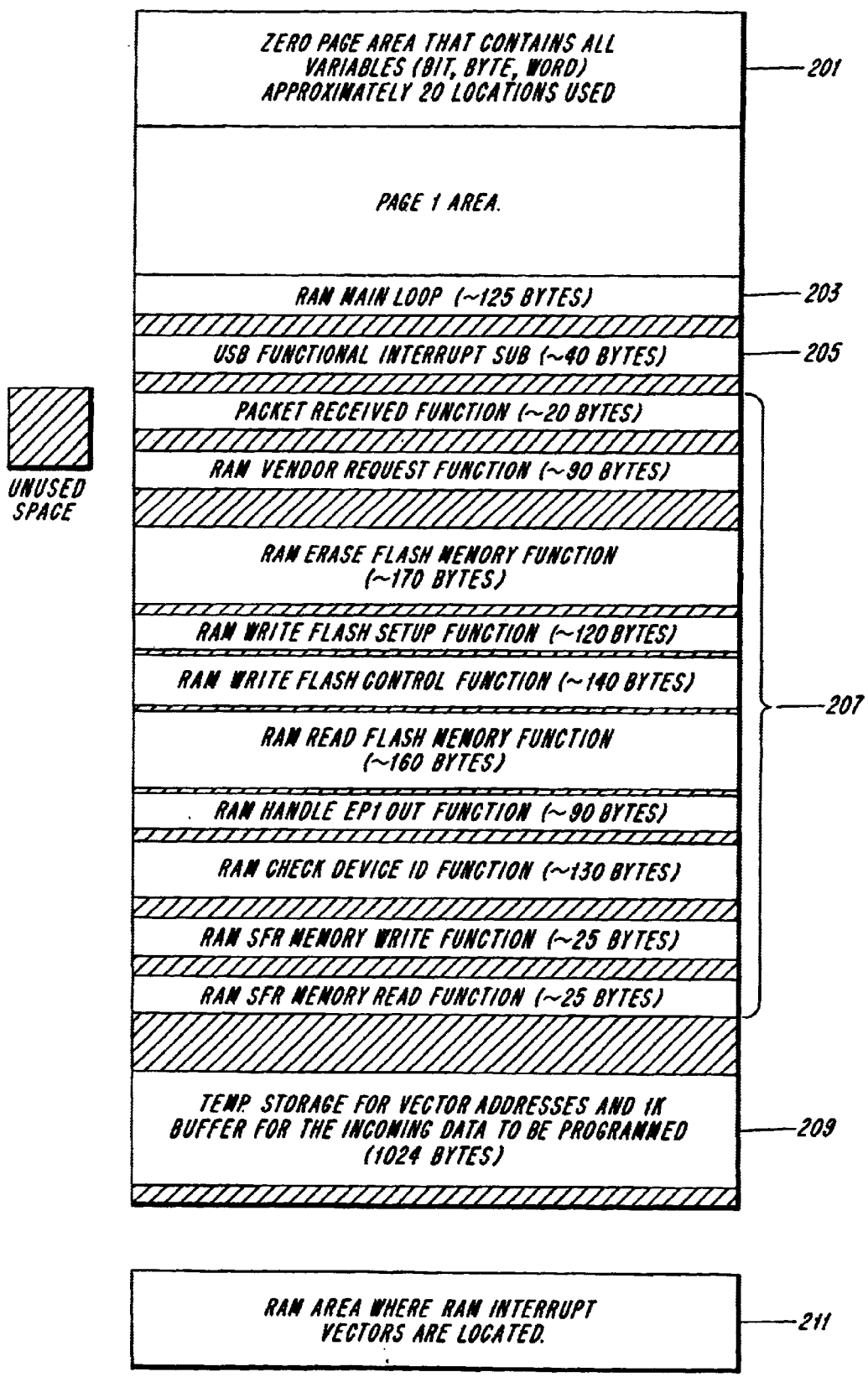
FIG. 2 illustrates an exemplary memory map of RAM that may be used to support the programming techniques described herein.

FIG. 2 illustrates an exemplary memory map of RAM that may be used to support the FOUSB techniques described herein. The exemplary memory map includes a zero-page area 201 for storing variables used during the rewrite FOUSB process. The map further includes a RAM main loop 203 that performs the necessary functions for programming the flash memory. These functions will be described in greater detail below. The memory map further includes a USB functional interrupt subroutine (ISR) 205. This subroutine processes the various interrupts activated during the FOUSB process. The memory map also includes several execution code modules 207 for performing the various functions needed to support the firmware programming process. Several of these functions are discussed in more detail below.

As can seen from the memory map shown in FIG. 2, memory usage for supporting the FOUSB process can require a significant portion of the overall RAM area. The amount memory usage may be reduced, however, as many of the FOUSB functions that require additional memory, such as RAM/SFR memory, Check ID, and incoming data buffer area 209 (discussed below), are optional. Additionally, not all of the USB protocol requests need be implemented and stored in RAM. Since the device has already been enumerated prior to the start of the programming process, there is no need to add the additional overhead of supporting several of the standard USB requests. It will be understood that the overall layout of the memory map and relative sizes of the functions included therein are merely illustrative, and that modifications to the map structure may be made without deviating from the spirit of the invention.

An important concept associated with the in-system FOUSB programming techniques described herein is the use of interrupts that vector (or switch execution) to RAM locations while programming the flash memory. According to an exemplary embodiment, a special bit of a mode register is set in order to support the interrupt vectoring function. When the mode register bit is set, a new set of interrupt vectors are copied and transferred to an area of RAM that resides "behind" the original vector table. This RAM area 211 is illustrated at the bottom of the memory map shown in FIG. 2.

The RAM area 211 is preferably designed to be just large enough to hold the copy of the vector table. The RAM area 211 can be set up to be a mirror memory area where data are stored. When active, rather than the firmware using the vector addresses stored within the device ROM, this new RAM area 211 becomes the active vectoring region that supports the vectoring of new interrupt pointer locations to other locations within the RAM (e.g., the locations where appropriate control programs are stored). An advantage to using the RAM area 211 in this manner is that RAM main loop 203 need not poll specific ROM interrupt bits during execution, thus allowing the loop to be more responsive to pending requests.

Interrupt vectoring according to an exemplary embodiment of the invention operates as follows. After normal device startup, the original device interrupt vectors are located in the device ROM. A second table, created prior to setup, is also stored in the ROM space. This second table is loaded into temporary RAM space 209 whenever it is desired to process interrupts from RAM, e.g., whenever the special bit of the mode register is set. Setting this bit allows the RAM area 211 to be accessed and written to by the device during device operation while being programmed over the USB interface. The second table loaded into temporary RAM space 209 is then written to the RAM area 211 and can be used to vector to other RAM areas for interrupt service routines initiated during the programming process. Alternatively, the second table may be stored directly into the RAM area 211 when the special bit of the mode register is set.

Another important aspect of the described FOUSB process involves the concept of changing configurations. As mentioned above, doing so gives the device the capability to change its "face" (or operation) midstream without having to unplug the USB cable or having to reboot the device.

Changing the configuration of a device is a function of the set of pre-defined Standard Request types implemented in the USB protocol standard. The request type used to change the configuration of the device is the "Set_Configuration" request. The request is communicated from the host PC to the device in a USB packet via the EP0 control endpoint 401. The standard request type definition for the change configuration command is shown in FIG. 3.

The standard request type definition for the change configuration command shown in FIG. 3 is typical of all USB standard, class, or vendor type requests. The definition includes a bmRequesttype field 301, which in this case is set to the hex value 0x00, indicating that the request type is a standard USB request. The bRequest field 303 further defines the specific type of request. In this example, the specific request is the "Set_Configuration" request, used to change the configuration of the device. The wValue field 305 may be used to store values used by the host PC or device that are associated with the specific request being transferred. In this example, the wValue field 305 stores the configuration value (Config Value) that the device is to change to (e.g., to effect a change in device operation from, say, a printer to a scanner). The value stored in the wValue field 305 may be zero, depending on the specific request being transferred.

The next field in the request definition is the wIndex field 307. This field is used to store the memory location where data is to be read from or written to when executing the specific request. The wIndex field 307 thus stores either a read address or a write address depending on the specific request being transferred. A wLength field 309 defines the length of the data block that is to be transferred. This value may be zero depending on the specific request, as in the example shown. Finally, the request definition includes a data field 311 that defines the type of data being transferred by the request. This filed may hold the value "none" if no data is to be exchanged when executing the specific request, as is the case in the example shown.

It may be advantageous to include the definition for the change configuration request within the descriptor tables associated with the USB peripheral device. This will enable the device to send the request definition to the host PC at enumeration. The request definition may contain device-specific interface and endpoint descriptors to be included with the configuration. The host PC can interpret and log these request definitions at enumeration for future reference. This will then allow the host PC to redefine endpoint sizes and functions when changing device configurations. The topic of endpoint definitions and usage will now be discussed in further detail.

As described above, the programming of a flash memory using the FOUSB techniques described herein employs the use and/or reconfiguration of several endpoints. In the preferred embodiment, three endpoints for transferring information between the host PC and USB device are defined. Endpoints are communication channels that may exist between the host PC and the USB peripheral device. The USB standard defines five endpoints for communicating using the standard USB protocol.

Figure 4:
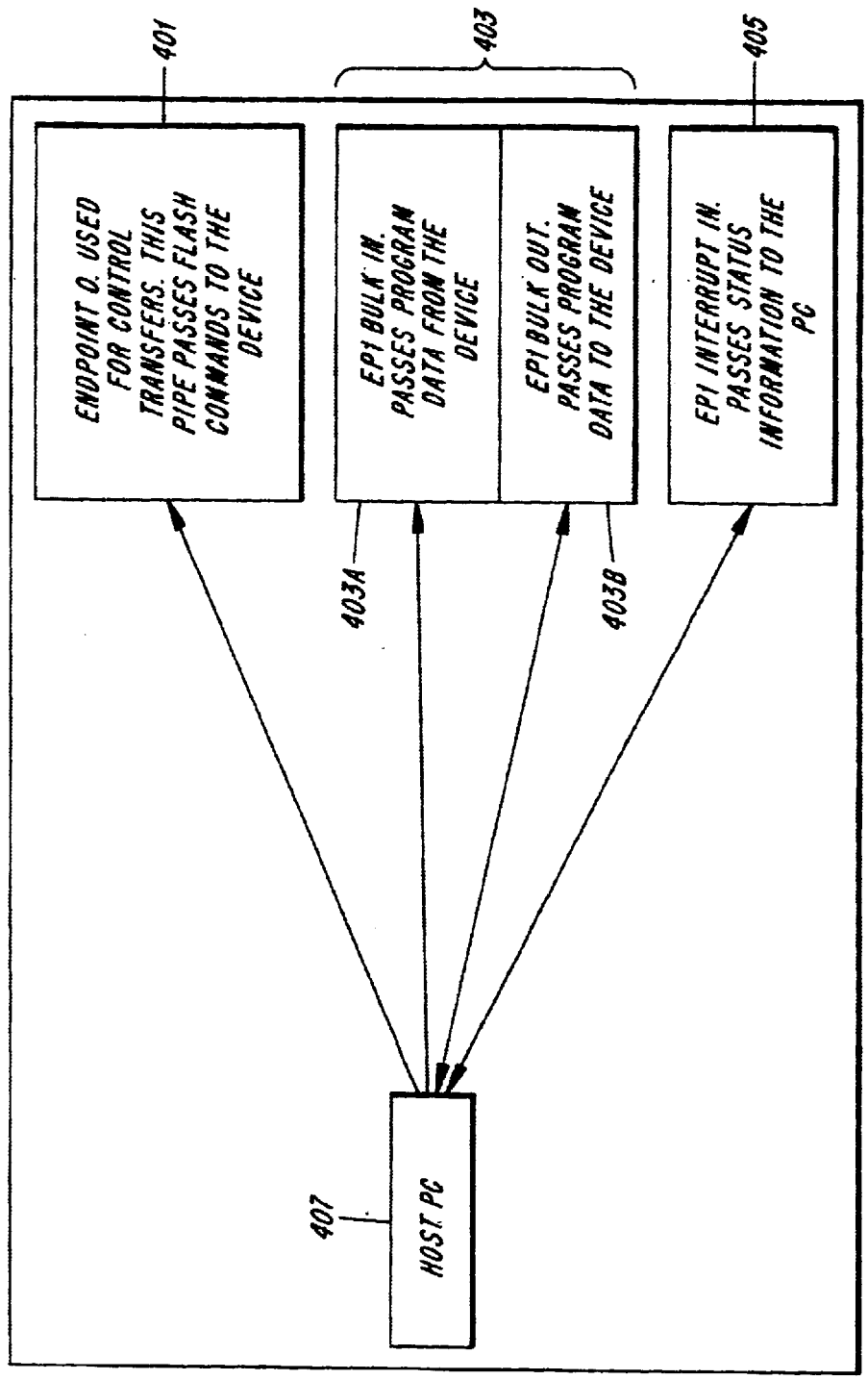
FIG. 4 illustrates and defines the three endpoints associated with the flash programming techniques described herein.

FIG. 4 illustrates and defines the three endpoints associated with the flash programming process. The first endpoint 401 is the EP0 control endpoint 401 discussed above. This endpoint is used to transfer control information (e.g., a change configuration request) between the host PC 407 and the USB device (not shown). The second endpoint 403 is used to transfer data for programming the on-board flash memory. The endpoint is logically separated into two sub-endpoints, BULK IN endpoint 403A and BULK OUT endpoint 403B. The sub-endpoints BULK IN 403A and BULK OUT 403B are used to send data stored in the onboard flash memory from the USB device to the host PC 407 for verification, and to send data from the host PC to the USB device for programming, respectively. A third endpoint, referred to as Interrupt IN 405, is used pass status information from the USB device to the host PC 407.

When the configuration of a device is changed using the Set_Configuration request, the prior transfer modes (i.e., the endpoint definitions) between the host PC and the USB device are potentially changed. It is preferred that any data transmissions pertaining to the prior interface are completed before the endpoint definitions for the new configuration are established. For example, when a device is configured as a printer and a page is printing at the time a Set_Configuration request is received, the device should finish its print operation before reconfiguring its endpoints in order to prevent data loss. The safeguarding of data should be handled on both the driver side (e.g., by the host PC) and on the device side of the endpoint interface. Accordingly, the PC driver should be responsible for finishing any pending requests before sending a configuration change request to the device, and the device should finish any data transfer operations prior to reconfiguring its endpoints should a change request nevertheless be received. A simple rewrite to endpoint size and configuration registers within the device is typically all that is required to reconfiguring the endpoint interface.

In the following paragraphs, several of the main control functions included in the FOUSB process are described in detail. These functions include: 1) initialization, 2) firmware erasing, 3) firmware programming, 4) firmware verification, and 5) reconfiguration. Other support functions, such as reading SFR/RAM areas and performing secutiry checking, can be included in the FOUSB process.

Before discussing the main control functions in detail, however, it will be helpful to first discuss device startup procedures. Recall that an important feature of the programming techniques described herein is that the peripheral device continues to use the USB core as its primary function, e.g., as a printer or as a scanner, during the programming process. It is thus necessary that the USB core be powered-up, and that the device be enumerated onto the bus prior to starting the programming process.

A typical device startup sequence may include the following steps:
Device reset—all peripheral blocks in the device are disabled;
Initial startup—variables are initialized, registers are set, and any other necessary startup procedures are performed; and then
Enabling of the USB core—Both the host PC and device are allowed to stabilize and the endpoints are initialized.

At this point interrupts are enabled in the device. When a USB cable is connected between the devices, the enumeration process begins. During the enumeration, the device informs the host PC of its capabilities and required transfer types. Also, device driver loading occurs in the host PC and any required initial communication between the host PC and device take place at this point. At this stage, the device performs its normal operations, e.g., the device operates as a printer, scanner, etc., as is said to be in its "base configuration".

Figure 5:
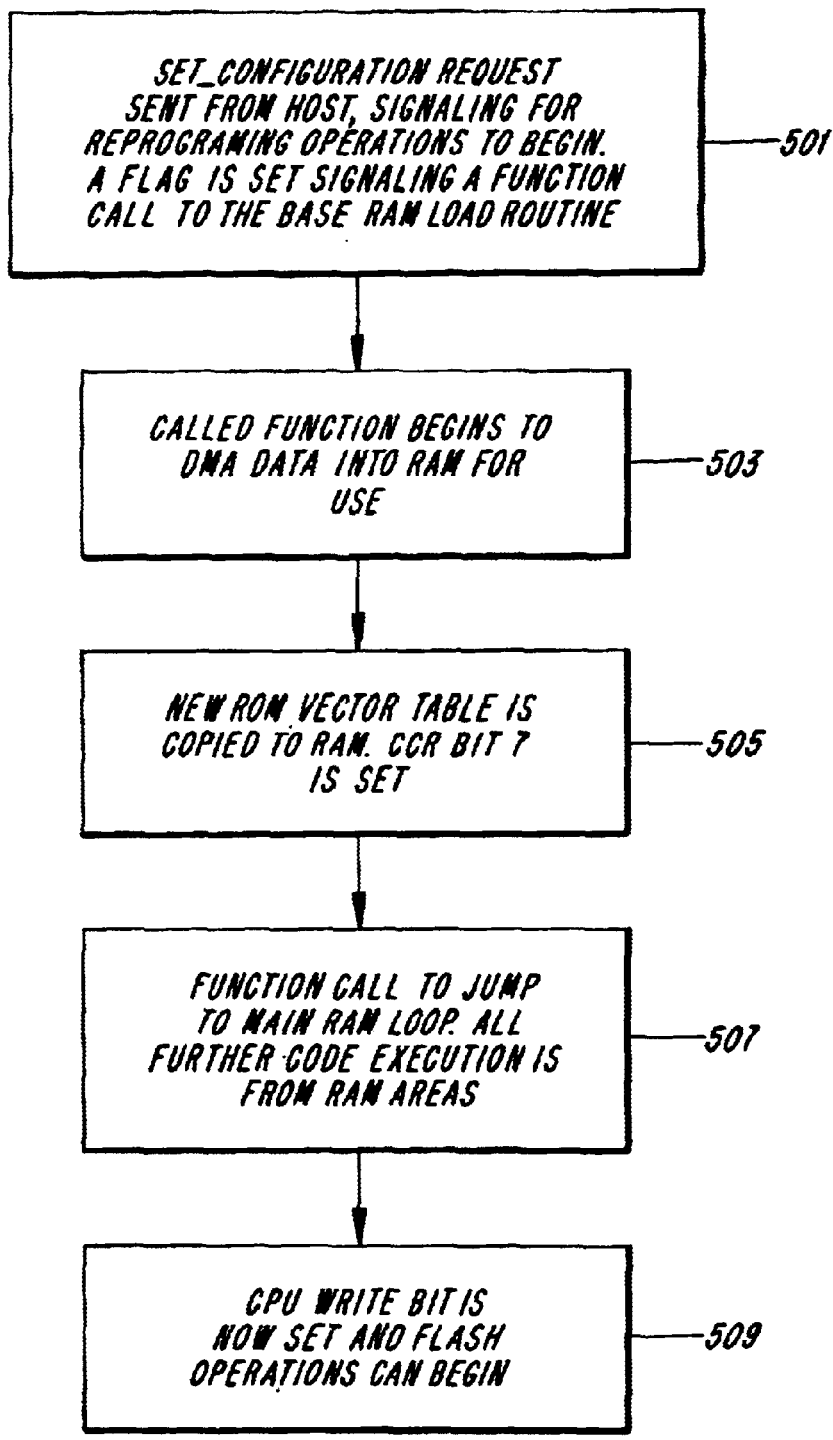
FIG. 5 is a flowchart illustrating the steps performed in the initialization phase associated the described techniques for in-system programming of the flash memory.

Once in its base configuration, the device firmware can be programmed or updated in-system using the USB interface according to the described FOUSB programming procedure. The first phase in performing the in-system programming of the flash memory is the initialization phase. The steps performed in the initialization are described in detail in the flowchart shown in FIG. 5.

The initialization process begins at step 501, where a Set_Configuration request is sent from the host PC to the device over endpoint zero 401 requesting an endpoint reconfiguration in the device. At this point, any data transfers occurring over the current endpoint interface are completed, and further data transfers are halted to prevent the possible loss of information during the configuration change. The device then performs the requested configuration change, and then sets the appropriate status bits over the Interrupt IN endpoint 405 to signal to the host PC that the change in mode has successfully occurred. After completing the request, interrupts in the device are temporally disabled.

Next, at step 503, the device executes a function that uses the DMA to transfer existing function for execution from ROM to RAM. At the completion of these transfers, the initialization process proceeds to step 505 where a copy of the ROM vector table is copied to a temporary area of RAM 209. The table is then copied to the RAM area 211, and the special bit of the mode register is set to allow data to be written to the RAM area 211, thereby again allowing interrupts from the device to again be processed while re-flashing memory. Next, at step 507, program execution jumps to the RAM main loop 203, from where all further code execution for performing the programming of the flash memory will be executed. The initialization process ends at step 509 with the setting of a CPU rewrite bit included in the mode register. At this stage, the device is now ready to accept commands from the host PC to program or update its onboard memory.

Figure 6:
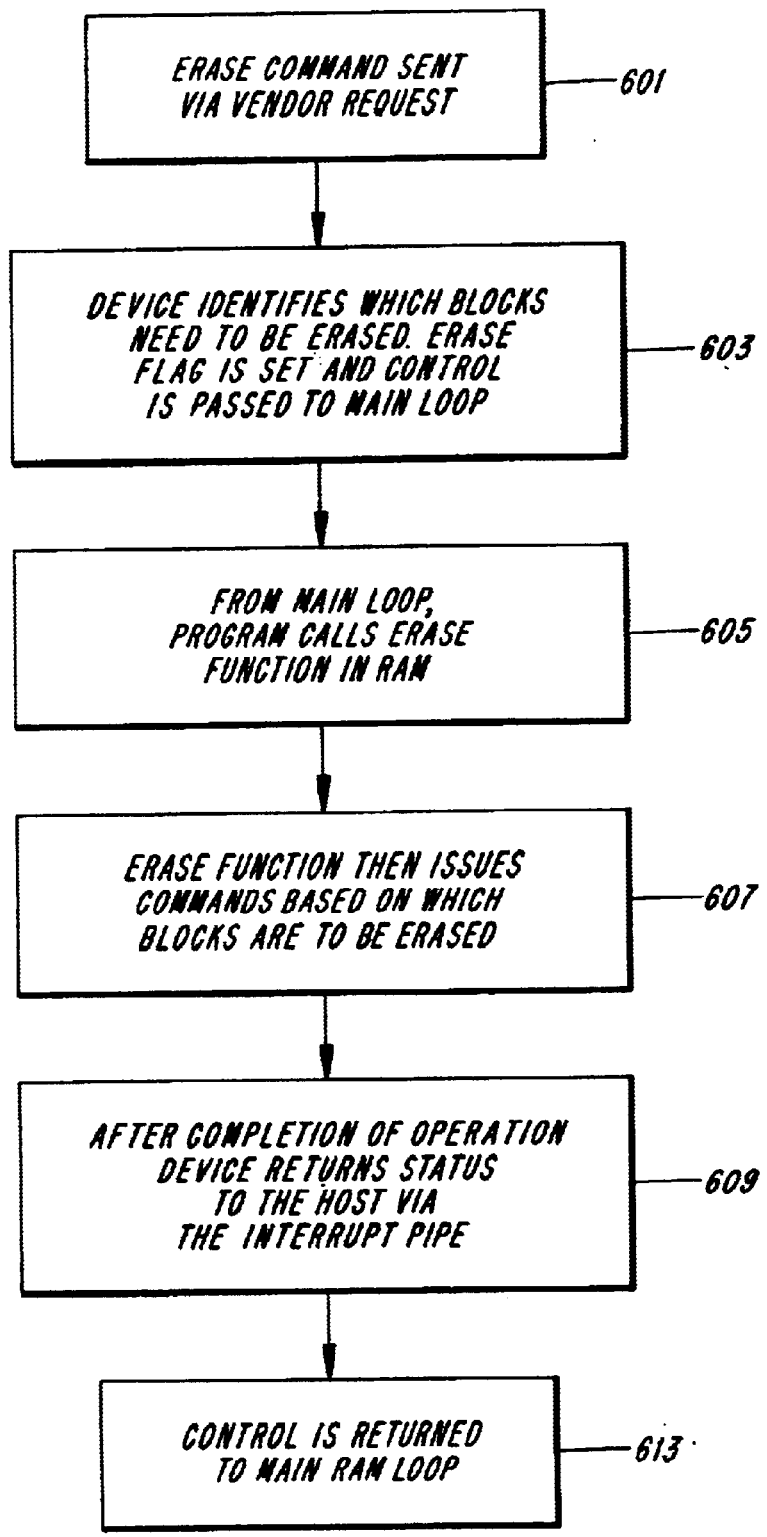
FIG. 6 is a flowchart that illustrates an exemplary erase operation used in with described programming techniques.

Before programming of the onboard memory can begin, those regions of the firmware memory that will be programmed with new data must first be erased. An exemplary erase operation is described in detail in the flowchart shown in FIG. 6. The process begins at step 601 with the sending of an Erase Command to the device via vendor request over EPO. Typically either the user or device driver selects which memory blocks to erase via control codes passed in the control data packet. Next, at step 603, the device Identifies those blocks in the firmware memory that are to be erased based upon the received vendor request. An Erase flag is set and control is passed to RAM main loop 203. At step 605, RAM main loop 203 calls the RAM erase function 207, shown in FIG. 2. The RAM erase control function 207 is then executed at step 607, issuing the appropriate commands based on which memory blocks are to be erased. After completion of the erase operation, the device returns status information to the host PC at step 609 via the Interrupt IN endpoint 405. Control is then returned to RAM main loop 203 at step 613.

Once erased, the onboard memory is then ready to be programmed with new firmware data. The programming phase is preferably performed as a two-step process, where data are first downloaded into RAM, and then programmed into the appropriate firmware memory locations. To support this two-step process, the memory map shown in FIG. 2 preferably includes a buffer area 209 where program data are stored prior to final transfer to the device onboard memory.

Figure 7:
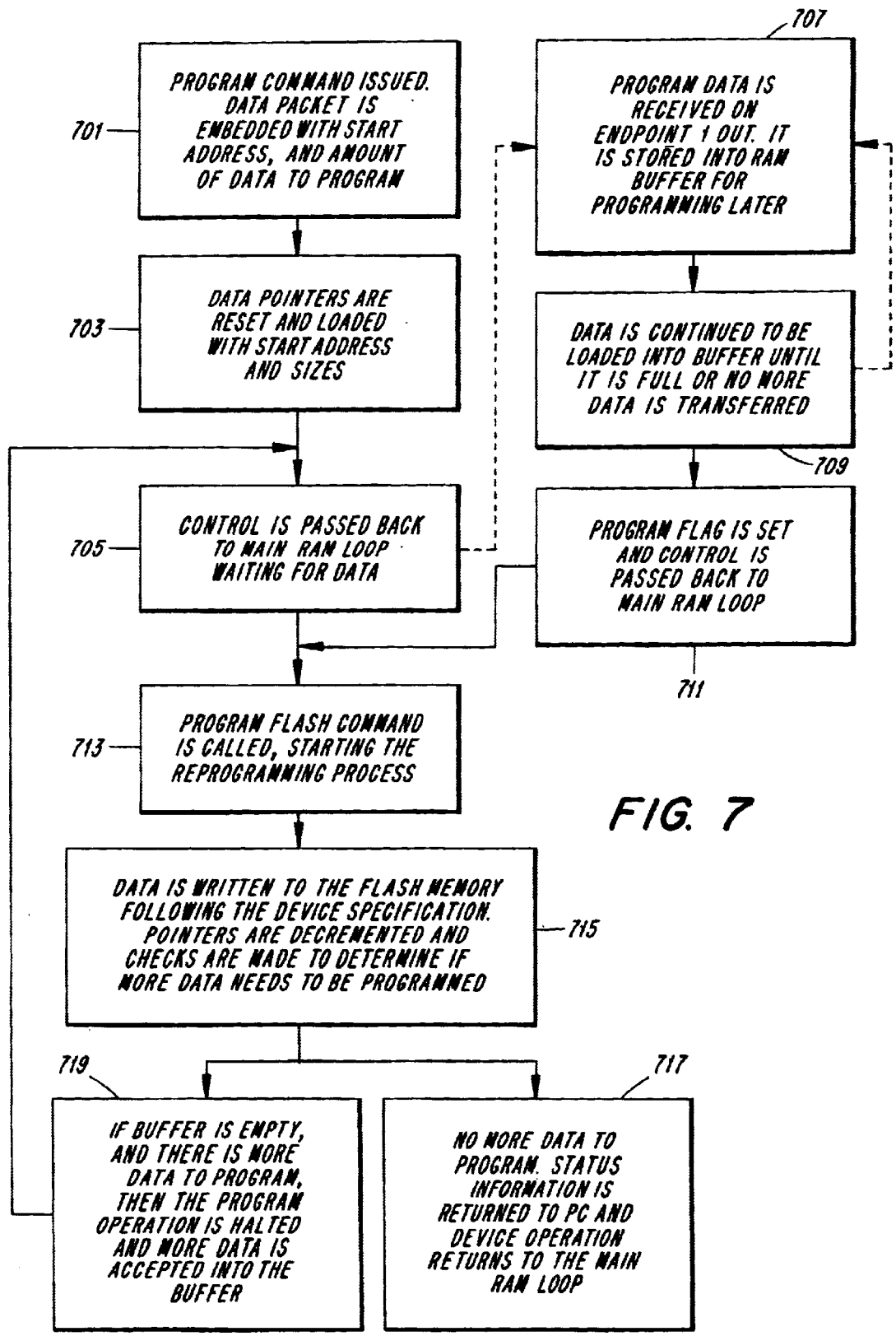
FIG. 7 is a flowchart that illustrates an exemplary process for programming the onboard memory.

An exemplary process for programming the onboard memory is depicted in the flowchart shown in FIG. 7. The process begins at step 701 where a Program command is issued by the host PC. The command is communicated to the device in a vendor request having a request definition structure similar to the structure shown in FIG. 3. A USB data packet carrying the request is sent to the device over EPO and is embedded with both a start address, where the program data is to be written to, and information specifying the amount of data that is to be programmed into the onboard memory. Next, at step 703, control is passed to routine that resets data pointers in the device, and then loads the pointers with the start address and size information included in the received vendor request packet. Control is then passed back to the RAM main loop 203 at step 705, at which point the main loop waits for data to be received on the BULK OUT endpoint 403B.

When program data is received on the BULK OUT endpoint 403B, control is passed to another routine at step 707 that extracts the data from the received USB packets. The program data is preferably temporarily stored in the buffer area 209 for later programming into the onboard memory. Data continues to be loaded into the buffer 209 at step 709 until either the buffer 209 is full or until no more data is to be transferred.

If the buffer 209 is filled, but more data remains to be programmed into the onboard memory, further data transmissions from the host PC are temporarily refused by the device via the sending of NAK flow control tokens over the Interrupt IN endpoint 405. The unaccepted packets containing the additional program data are not lost, but rather the host PC will continue to retransmit the packets to the device in order, until the device again acknowledges successful receipt of the data via ACK flow control tokens sent over the Interrupt IN endpoint 405. When either the buffer 209 is full or when there is no more program data to be transferred to the device, the data extraction routine sets a program flag at step 711 to indicate that the data is ready to programmed into the onboard memory, and then passes control back to the RAM main loop 203.

In response to the program flag being set, the RAM main loop 203 then calls a routine to program the onboard memory at step 713. The program routine writes data into the onboard memory according the device specification at step 715. The data pointers holding the starting address and size of the program data block being written are decremented and checks are made to determine when the programming process completes. When the buffer area 209 is emptied, the program operation is halted at either step 717 or step 719. The program routine then determines at step 719 whether more data remains to be programmed into the onboard memory. If more data remains, control is returned to the RAM main loop 203 at step 705, where loop waits for more data to arrive on the BULK OUT endpoint 403B. Process steps 707 through 711 are again executed to store program data, received on the BULK OUT endpoint 403B, into the buffer area 209 until the buffer is again filled or no more data remains to be programmed. Programming takes place in steps 713 through 719 as described above. When all the data has been programmed into the onboard memory, the program routine sends status information to the host PC via the Interrupt IN endpoint 405.

Figure 8:
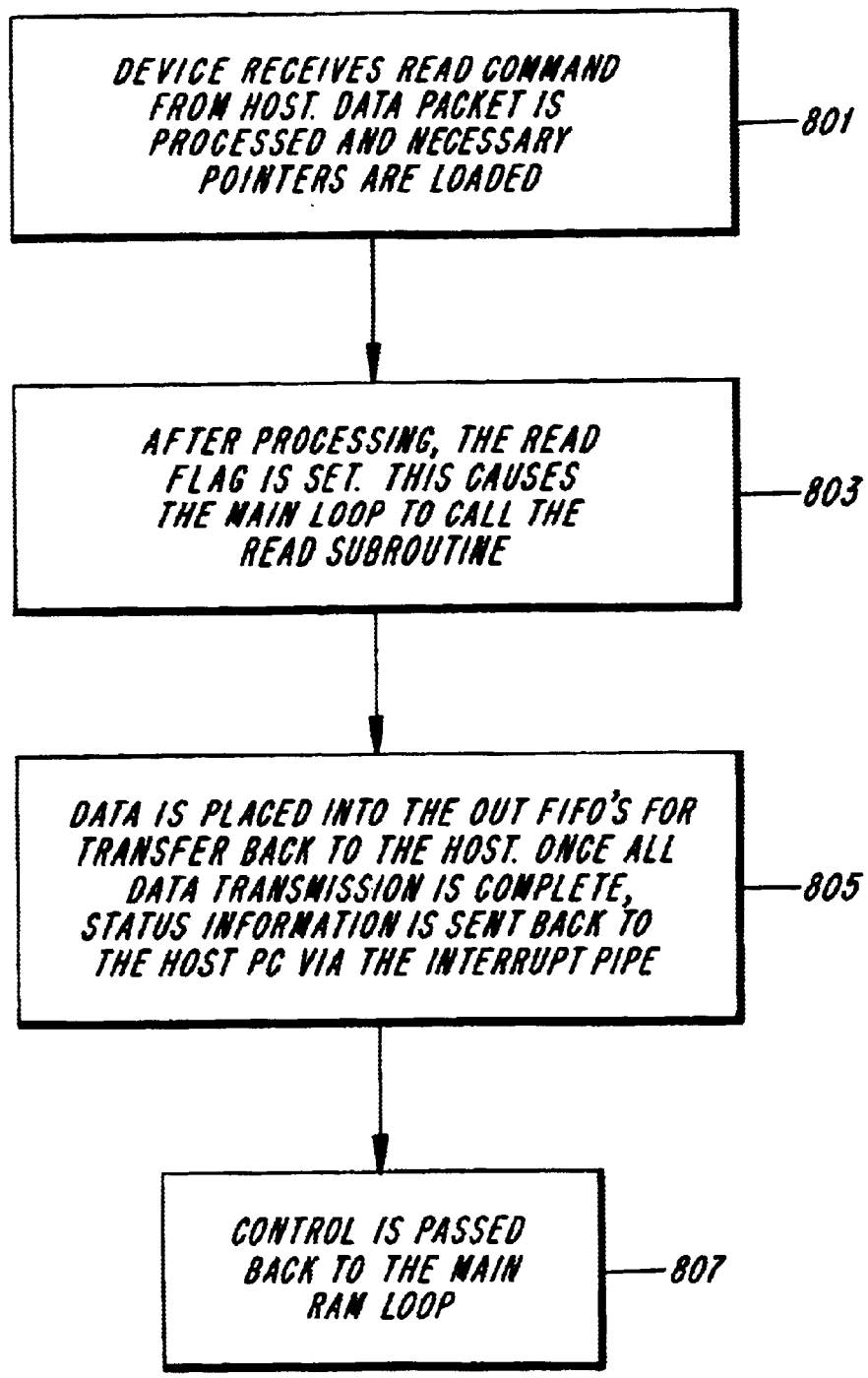
FIG. 8 is a flowchart illustrating an exemplary method for reading the program data stored in the onboard memory.

An exemplary method for reading the program data stored in the onboard memory is shown in FIG. 8. The process starts at step 801, where the device receives a read command in a USB packet carried over the EPO control endpoint 401. Again, the read command is sent as a vendor request having a structure similar to that shown in FIG. 3. The request includes wValue and wLength values that define the starting address in the device where the program is to be read and the size of the block of data to be read, respectively. These values are extracted from the USB packet are used to load pointers in the device used for performing the read operation.

When the pointers have been successfully loaded, a read flag is set at step 803 and the RAM main loop 203 calls an appropriate routine to read the program data. The read routine places the read program data into FIFO registers for the BULK IN endpoint 403A at step 805 for transfer back to the host PC. When the transfer is complete, appropriate status information is sent to the host PC over the Interrupt IN endpoint 405. Control is then passed back the RAM main loop 203 at step 807.

Several methods for verifying the data programmed into the onboard memory may be employed. According to a preferred embodiment, after the programmed data is read from device into the host PC as described above, the host PC then compares the read data with an image of the program data stored on the PC. Having the host PC perform the verification rather than the devices speeds up and simplifies the verification process. If an error is detected in the read data, the error is trapped by the host PC, and corrective action may be taken, such as reprogramming the onboard memory to correct the data errors.

Once the programmed data has been verified, the device can be reconfigured to return from the programming mode and resume its full normal operations. How the device returns from the programming mode may depend on how much of the onboard memory was programmed. If only a small portion of the onboard memory has been programmed, then returning from the programming mode is as simple as returning from any other type of function call. The steps involved may include:

Sending a Set_Configuration request to the device in a USB packet, requesting that the device return to its full normal operations—the received packet is parsed, but the configuration is not transferred to the USB core, instead the request is held at the status stage;

Temporarily disabling interrupts in the device;

Returning endpoints to their original configuration;

Disabling CPU rewrite functionality in the device, allowing the onboard memory to again be read by the device;

Disabling RAM interrupts, returning interrupt vectoring from RAM to the original vector table;

Signaling the RAM main loop 203 to return control to the main program loop; and Once in the main program loop, allowing the Set_Configuration request to transfer to the USB core, enabling the device resume full normal operations.

Should the programming process result in the entire onboard memory space being reprogrammed, certain measures should be taken to ensure that problems do not occur within the device when returning from the programming mode. Problems may occur as a result the program execution returning to an area in the memory where execution code no longer exists, or to an area where the execution code is incorrect. There are several ways to address this problem, including resetting the device after the programming process is complete, or perhaps keeping an inherent "boot up" code area in the memory that never changes.

Figure 9:
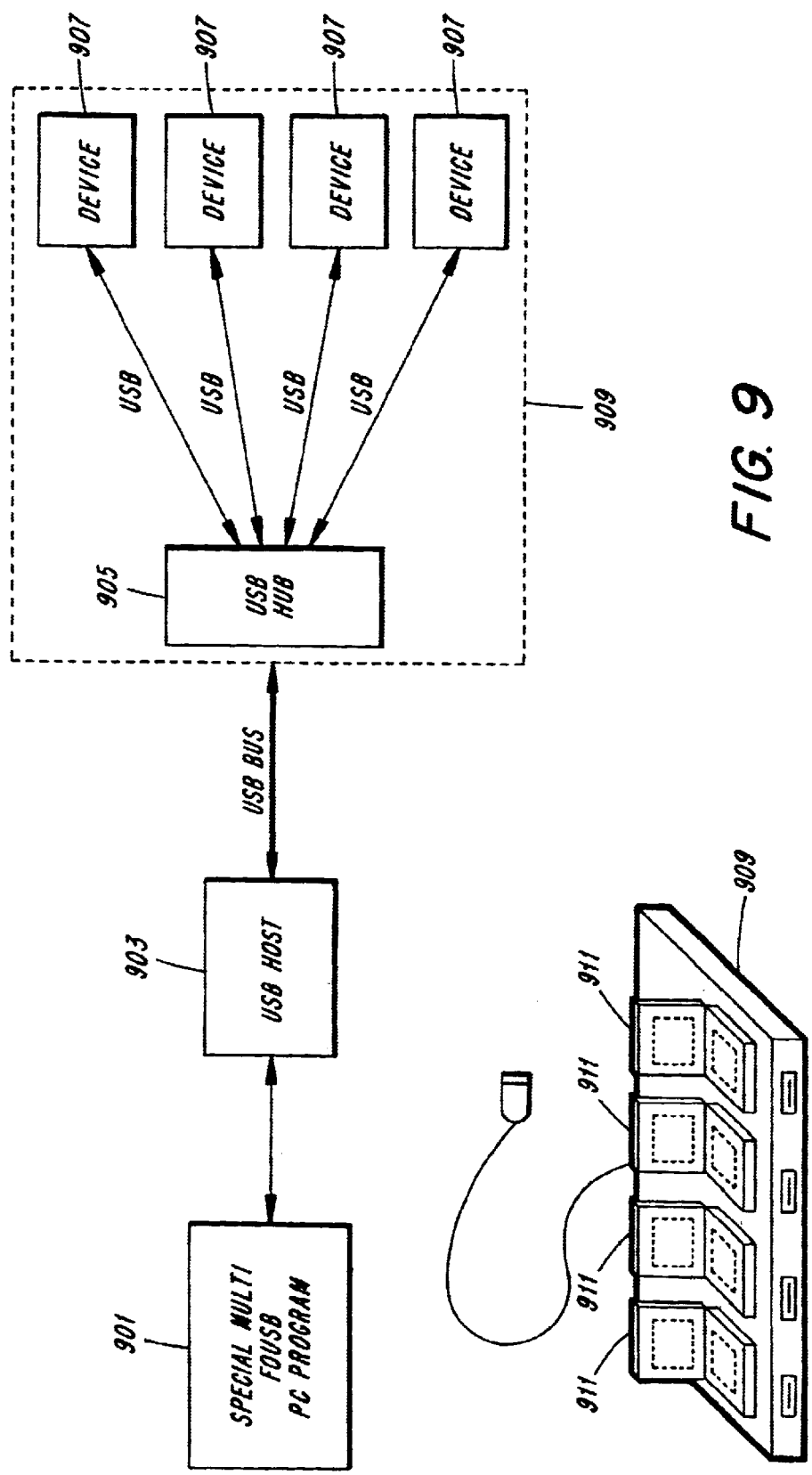
FIG. 9 illustrates an arrangement for providing for parallel programming of several USB devices at one time.

The FOUSB programming techniques described herein may be combined with the multi-device connectivity capabilities of USB to provide for the parallel programming of several USB devices at one time. Such an arrangement is depicted in FIG. 9. The arrangement includes a host PC 901 running a multi-FOUSB program. This program sends Erase-Program-Verify commands to each of the devices 907 to be programmed as described above. The host PC 901 may be connected to a USB host 903 to send the FOUSB commands to the devices 907, or the USB host functionality may be included in the host PC 901 itself. The USB host 903 manages communications and bandwidth sharing between the host PC 901 and the devices 907. Conventional multi-programmer systems that employ serial programming protocols inefficiently require that the devices being programmed themselves manage these tasks. The USB host 903 is further connected to a USB hub 905, which in turn provides dedicated USB connections to each of the devices 907 to be programmed.

When the devices 907 are connected to the USB hub 905 they will automatically begin enumeration communications with the host PC 901 as described earlier. Once a new device 907 becomes active on the bus, a device driver will be loaded in the host PC 901 and the multi-FOUSB program will be informed that the new device has been attached its USB bus. The program will then send Erase-Program-Verify commands to the newly connected device. Preferably, the USB boot code in each device will be the same. This will, in turn, cause the host PC 901 operating system to link to the same device driver, creating another "instance" of the driver, each time a new device begins the enumeration process. The multi-FOUSB program will be notified that a "new driver" has been attached, but will have the ability to distinguish between instances of the same device driver. This will allow the program maintain separate communications between the different devices separate, thus efficiently allowing multiple devices to be programmed using the with same driver.

Since each device being programmed is communicating independently with the host PC 901, multiple chips may be programmed at one time. Bandwidth will be shared on the USB bus as a result of the nature of the communications. Devices that receive new program data over the bus will have to first program this data into their respective onboard memories before requesting additional information over the bus. Other devices will be able to access the USB bus during these programming times. The USB host 903 is also capable of evenly timesharing the bandwidth across each of the attached devices requesting information over the bus.

The devices 907 may be programmed in-system, as described earlier, or a separate multi-device programmer 909 may be provided specifically for task of simultaneously programming the devices 907. The multi-device programmer 909 preferably includes the functionality of the USB hub 905 and sockets 911 for holding the devices 907 to be programmed. The sockets 911 may of the "clam-shell" type, and preferably are arranged such that when a connector cover is closed, the device carried in the connector will automatically begin to enumerate to the USB host 903. Because the devices 907 in such an arrangement are being programmed "in-circuit", there is no need for further hardware interaction between the devices 907 and the host PC 901.

It will be appreciated that the steps of the methods illustrated above may be readily implemented either by software that is executed by a suitable processor or by hardware, such as an application-specific integrated circuit (ASIC).

The various aspects of the invention have been described in connection with a number of exemplary embodiments. To facilitate an understanding of the invention, many aspects of the invention were described in terms of sequences of actions that may be performed by elements of a computer system. For example, it will be recognized that in each of the embodiments, the various actions could be performed by specialized circuits (e.g., discrete logic gates interconnected to perform a specialized function), by program instructions being executed by one or more processors, or by a combination of both.

Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

Various embodiments of Applicants' invention have been described, but it will be appreciated by those of ordinary skill in this art that these embodiments are merely illustrative and that many other embodiments are possible. The intended scope of the invention is set forth by the following claims, rather than the preceding description, and all variations that fall within the scope of the claims are intended to be embraced therein.

What is claimed is:

1. A method for in-system programming of non-volatile, programmable, electrically erasable device memory using a USB interface, the method comprising the steps of:
    enumerating at least one device onto a USB bus with a first hardware configuration;
    encapsulating programming commands and program data into USB packets according to a custom protocol;
    sending the USB packets including the encapsulated programming commands and program data to the at least one device over the USB bus; and
    programming at least a portion of the device memory in response to receiving the programming commands and program data at the at least one device;
    wherein at least partial functionality of the at least one device as defined by the first hardware configuration is maintained while the device memory is programmed.

2. The method of claim 1, further comprising the steps of:
    changing at least partially the first hardware configuration of the at least one device in response to receiving a first programming command at the at least one device;
    loading at least one of a plurality control functions of a code module stored in a portion of the device memory into RAM;
    executing the at least one control function from RAM using the programming commands and program data received at the at least one device to program the device memory; and
    restoring the hardware configuration of the device back to the first hardware configuration in response to receiving a second programming command at the at least one device after the device memory is programmed.

3. The method of claim 2, wherein the code module includes at least:
    a main loop function for managing the processing of programming commands sent over the USB bus;
    a packet exchange function for transferring USB packets over the USB bus;
    a vendor request function for encapsulating/extracting programming commands and program data into/from the USB packets according to the custom protocol;
    an erase function for erasing information stored in the at least a portion of the device memory;
    a write function for writing program data extracted from the USB packets by the vendor request function to the at least a portion of the device memory; and
    a read function for reading program information stored in the at least a portion of the device memory.

4. The method of claim 2, further comprising the steps of:
    disabling interrupts associated with the first hardware configuration in response to receiving the first programming command;
    copying an interrupt vector table for processing interrupts associated with the first hardware configuration to RAM; and
    enabling interrupts associated with the first hardware configuration to be processed from RAM.

5. The method of claim 2, wherein direct memory addressing is used to load the at least one control function stored in a portion of the device memory into RAM.

6. The method of claim 1, further comprising the step of:
    erasing information stored in the at least a portion of the device memory prior to the programming step in response to receiving a third programming command at the at least one device.

7. The method of claim 6, where the step of erasing information stored in the at least a portion of the device memory comprises the steps of:
    determining the location and size of the at least a portion of the device memory to be erased from information included in the third programming command;
    loading an erase function stored in a portion of the device memory into RAM;
    executing the erase function from RAM to erase the information stored in the at least a portion of the device memory; and
    sending status information over the USB bus upon completion of the erasing of the information stored in the at least a portion of the device memory.

8. The method of claim 1, further comprising the step of:
    reading information stored in the at least a portion of the device memory after the programming step in response to receiving a fourth programming command at the at least one device.

9. The method of claim 8, where the step of reading information stored in the at least a portion of the device memory comprises the steps of:
    determining the location and size of the at least a portion of the device memory to be read from information included in the fourth programming command;
    loading a read function stored in a portion of the device memory into RAM;
    executing the read function from RAM to read the information stored in the at least a portion of the device memory and to send the read information over the USB bus; and
    sending status information over the USB bus upon completion of the reading and sending of the information stored in the at least a portion of the device memory.

10. The method of claim 8, further comprising the steps of:
    verifying the information read from the at least a portion of the device memory to determine if the information is properly programmed into the device memory; and
    reprogramming information into the at least a portion of the device memory determined to be invalid in the verifying step.

11. The method of claim 1, wherein the step of programming the at least a portion of the device memory comprises the steps of:

determining the location and size of the at least a portion of the device memory to be programed from information included in the programming commands;

receiving the program data sent over the USB bus into a RAM buffer until one of the RAM buffer is full and no more program data is received;

loading a program data function stored in a portion of the device memory into RAM;

executing the program data function from RAM to store the received program data into the at least a portion of the device memory;

repeating the steps of receiving program data and executing the program data function when the RAM buffer is full and additional program data remains to be stored in the device memory; and sending status information over the USB bus upon completion of the storing of the program data into the at least a portion of the device memory.

12. The method of claim 1, further comprising the steps of:

enumerating multiple USB devices onto the USB bus, each with a respective first hardware configuration; and controlling the flow of programming commands and program data sent over the USB bus to each of the devices enumerated onto the USB bus to manage the simultaneous programming of at least a portion of the device memory included in each respective device.

13. The method of claim 1, wherein a plurality of endpoints are used to exchange information encapsulated into USB packets according to the custom protocol over the USB bus, the endpoints including:

a control endpoint for exchanging USB packets having encapsulated programming commands;

a bulk endpoint having a bulk IN channel for sending USB packets having encapsulated program data to the at least one device and a bulk OUT channel for sending USB packets having encapsulated program data from the at least one device over the USB bus; and an interrupt IN endpoint for sending USB packets having encapsulated status information from the at least one device over the USB bus.

14. The method of claim 1, wherein information encapsulated into USB packets according to the custom protocol and exchanged over the USB bus includes information stored in:

a request type field;

a request identifier field;

a request value field;

a data field;

a data length fields; and an address index field.

15. The method of claim 14, wherein the information stored in the request type field is one of a standard type request, a class type request, and a vendor type request.

16. The method of claim 15, wherein if the information stored in the request type field is a vendor type request, the information stored in the request identifier field includes one of at least an erase request, a device memory write request, a device memory read request, a check_id request, a get_device_info request, a RAM read request, a RAM write request, and a jump-to-function request.

17. An arrangement for in-system programming of non-volatile, programmable, electrically erasable device memory using a USB interface, the arrangement comprising:

a host coupled to a USB bus;

at least one device enumerated onto the USB bus with a first hardware configuration;

a FOUSB program executing on the host that generates programming commands and program data to manage the programming of at least a portion of the device memory of the at least one device;

a custom protocol for encapsulating the programming commands and program data generated by the FOUSB program into USB packets transmitted by the host to the at least one device over the USB bus;

a code module stored in a portion of memory of the at least one device, the code module having a plurality of control functions; and logic that programs the at least a portion of the device memory in response to the programming commands and program data generated by the FOUSB program;

wherein at least partial functionality of the at least one device as defined by the first hardware configuration is maintained while the device memory is programmed.

18. The arrangement of claim 17, further comprising the steps of:

logic that changes at least partially the first hardware configuration of the at least one device in response to receiving a first programming command at the at least one device;

logic that loads at least one of a plurality control functions stored in the portion of the device memory into RAM;

logic that executes the at least one control function from RAM using the programming commands and program data received at the at least one device to program the device memory; and logic that restores the hardware configuration of the device back to the first hardware configuration in response to receiving a second programming command at the at least one device after the device memory is programmed.

19. The arrangement of claim 18, wherein the code module includes at least:

a main loop function for managing the processing of programming commands sent over the USB bus;

a packet exchange function for transferring USB packets over the USB bus;

a vendor request function for encapsulating/extracting programming commands and program data into/from the USB packets according to the custom protocol;

an erase function for erasing information stored in the at least a portion of the device memory;

a write function for writing program data extracted from the USB packets by the vendor request function to the at least a portion of the device memory; and a read function for reading program information stored in the at least a portion of the device memory.

20. The arrangement of claim 18, further comprising:

logic that disables interrupts associated with the first hardware configuration in response to receiving the first programming command;

logic that copies an interrupt vector table for processing interrupts associated with the first hardware configuration to RAM; and logic that enables interrupts associated with the first hardware configuration to be processed from RAM.

21. The arrangement of claim 18, further comprising:

a direct memory addressing that loads the at least one control function stored in a portion of the device memory into RAM.

22. The arrangement of claim 17, further comprising:
logic that erases information stored in the at least a portion of the device memory prior to the programming step in response to receiving a third programming command at the at least one device.

23. The arrangement of claim 22, where the logic that erases information stored in the at least a portion of the device memory comprises:
logic that determines the location and size of the at least a portion of the device memory to be erased from information included in the third programming command;
logic that loads an erase function stored in a portion of the device memory into RAM;
logic that executes the erase function from RAM to erase the information stored in the at least a portion of the device memory; and
logic that sends status information over the USB bus upon completion of the erasing of the information stored in the at least a portion of the device memory.

24. The arrangement of claim 17, further comprising:
logic that reads information stored in the at least a portion of the device memory after the programming step in response to receiving a fourth programming command at the at least one device.

25. The arrangement of claim 24, where the logic that reads information stored in the at least a portion of the device memory comprises:
logic that determines the location and size of the at least a portion of the device memory to be read from information included in the fourth programming command;
logic that loads a read function stored in a portion of the device memory into RAM;
logic that executes the read function from RAM to read the information stored in the at least a portion of the device memory and to send the read information over the USB bus; and
logic that sends status information over the USB bus upon completion of the reading and sending of the information stored in the at least a portion of the device memory.

26. The arrangement of claim 24, further comprising:
logic that verifies the information read from the at least a portion of the device memory to determine if the information is properly programmed into the device memory; and
logic that re-programs information into the at least a portion of the device memory determined to be invalid in the verifying step.

27. The arrangement of claim 17, wherein the logic that programs the at least a portion of the device memory comprises:
logic that determines the location and size of the at least a portion of the device memory to be programed from information included in the programming commands;
logic that receives the program data sent over the USB bus into a RAM buffer until one of the RAM buffer is full and no more program data is received;
logic that loads a program data function stored in a portion of the device memory into RAM;
logic that executes the program data function from RAM to store the received program data into the at least a portion of the device memory;
logic that repeats the steps of receiving program data and executing the program data function when the RAM buffer is full and additional program data remains to be stored in the device memory; and
logic that sends status information over the USB bus upon completion of the storing of the program data into the at least a portion of the device memory.

28. The arrangement of claim 17, further comprising:
a plurality of USB devices enumerated onto the USB bus, each with a respective first hardware configuration; and
logic that controls the flow of programming commands and program data sent over the USB bus to each of the devices enumerated onto the USB bus to manage the simultaneous programming of at least a portion of the device memory included in each respective device.

29. The arrangement of claim 28, further comprising:
a USB host controller coupled to the host that controls the flow of programming commands and program data sent over the USB bus; and
a USB hub coupled to the USB host controller by a first USB link, and to each of the plurality of USB devices by respective USB links, the USB links forming the USB bus.

30. The arrangement of claim 17, further comprising a plurality of endpoints coupled between the host and the at least one device, the endpoints including:
a control endpoint for exchanging USB packets having encapsulated programming commands;
a bulk endpoint having a bulk IN channel for sending USB packets having encapsulated program data to the at least one device and a bulk OUT channel for sending USB packets having encapsulated program data from the at least one device over the USB bus; and
an interrupt IN endpoint for sending USB packets having encapsulated status information from the at least one device over the USB bus.

31. The arrangement of claim 17, wherein information encapsulated into USB packets according to the custom protocol and exchanged over the USB bus includes information stored in:
a request type field;
a request identifier field;
a request value field;
a data field;
a data length fields; and
an address index field.

32. The arrangement of claim 31, wherein the information stored in the request type field is one of a standard type request, a class type request, and a vendor type request.

33. The arrangement of claim 32, wherein if the information stored in the request type field is a vendor type request, the information stored in the request identifier field includes one of at least an erase request, a device memory write request, a device memory read request, a check_id request, a get_device_info request, a RAM read request, a RAM write request, and a jump-to-function request.

* * * * *